(12) United States Patent
Wang

(10) Patent No.: US 6,382,046 B1
(45) Date of Patent: May 7, 2002

(54) TRANSMISSION SHIFTER WITH CABLE DISENGAGEMENT MECHANISM

(75) Inventor: Yong Qiang Wang, Rochester Hills, MI (US)

(73) Assignee: Dura Automotive Properties, Rochester Hills, MI (US)

( * ) Notice: Subject to any disclaimer, the term of this patent is extended or adjusted under 35 U.S.C. 154(b) by 0 days.

(21) Appl. No.: 09/500,861

(22) Filed: Feb. 9, 2000

(51) Int. Cl.[7] .............................................. F16H 59/02
(52) U.S. Cl. .................. 74/473.15; 74/473.18
(58) Field of Search ......................... 74/473.15, 473.18

(56) References Cited

U.S. PATENT DOCUMENTS

| | | | |
|---|---|---|---|
| 4,850,238 A | * | 7/1989 | Inoue ...................... 74/473.15 |
| 4,905,530 A | | 3/1990 | Stehle et al. |
| 4,987,792 A | | 1/1991 | Mueller et al. |
| 5,044,220 A | | 9/1991 | Raff et al. |
| 5,062,314 A | | 11/1991 | Maier et al. |
| 5,070,740 A | | 12/1991 | Giek et al. |
| 5,150,633 A | | 9/1992 | Hillgartner |
| 5,791,197 A | | 8/1998 | Rempinski et al. |
| 5,870,929 A | | 2/1999 | Bravo |
| 5,875,684 A | | 3/1999 | Bravo |

* cited by examiner

Primary Examiner—Allan D. Herrmann
(74) Attorney, Agent, or Firm—C. R. Kiczek

(57) ABSTRACT

A transmission shifter is disclosed for controlling a transmission of a motor vehicle by a cable in some instances and an electronic control in other instances. The transmission shifter has a base, a cable attachment bracket mounted on the base and pivotable about a first axis, and a shift lever pivotably mounted on the base. In a first segment of the first shift path the shift lever is movable in a cable-actuation mode and the shift lever urges the cable attachment bracket to pivot about the first axis, and in a second segment of the first shift path the shift lever is movable in an electronic-actuation mode and the shift lever does not urge the cable attachment bracket to pivot bout the first axis.

19 Claims, 7 Drawing Sheets

TRANSMISSION SHIFTER WITH CABLE DISENGAGEMENT MECHANISM

FIELD OF THE INVENTION

The present invention is directed to transmission shifters for motor vehicles, and more particularly to improvements in transmission shifters which control the gear transmission of a motor vehicle via either a cable or an electronic control.

BACKGROUND OF THE INVENTION

Transmission shifters, whether column mounted or floor mounted, are used to control the gear transmission in a motor vehicle. Typically the transmission shifter has a shift lever which is pivotable over a series of positions: park, reverse, neutral, drive and one or more lower gears, for example. Such transmission shifters can be cable actuated or electronically actuated. For cable-actuated shifters, rotation of the shift lever pulls or pushes on a cable, transmitting load to the gear transmission of the motor vehicle. In more recent years it has become desirable to have electronic controls for the transmission shifter. With electronic shifting, movement of the shift lever to each position sends a signal to the gear transmission to move to a corresponding gear position. For example, magnets and Hall effect sensors may be used, with each magnet positioned to correspond to a particular gear transmission position. Electronic shifting is desirable in that there are fewer routing limitations for electric wiring than for larger cable assemblies. Electronic shifting is also desirable to provide a "tiptronic" shifting option, where the transmission is shifted up or down one gear lever by moving the shift lever incrementally. That is, the shift lever is in a tiptronic position and the gear transmission is shifted up one level (for example, from second gear to first gear) by moving the shift lever in a first direction from the tiptronic position, and the gear transmission is shifted down one level by moving the shift lever in a second direction, often a direction opposite the first direction. For examples or electronic shifting and tiptronic shifting see U.S. Pat. No. 5,070,740 to Giek et al and U.S. Pat. No. 5,791,197 to Rempinski et al.

However, an entirely electronically controlled shifter can be expensive because of the need for an electric starter motor strong enough to move the gears in some instances, e.g., when parked on a steep hill. Moreover, if the transmission was in the park position and there was a power failure, additional means would be required to move the transmission out of the park position, increasing the overall cost of the assembly.

Accordingly, there is a need for a transmission shifter capable of electronic-actuation while also being capable of cable actuation in some instances. In view of the foregoing, it is an object of the present invention to provide a transmission shifter which is of simple construction and low cost, and which is capable of changing the gears of a motor transmission by both cable-actuation and electronic-actuation. It is an additional object of the present invention to provide a transmission shifter that is highly reliable in operation, which can be manufactured efficiently, which is of an elegant design having fewer parts, less weight, less tooling and machining requirements and overall reduced cost while at least maintain high quality and reliability in shifting. Additional objects and optional features of the invention will be apparent form the following disclosure and detailed discussion of preferred embodiments.

SUMMARY OF THE INVENTION

In accordance with a first aspect, a transmission shifter for controlling a transmission of a motor vehicle by both a cable and an electronic control comprises a base, a cable attachment bracket mounted on the base and pivotable about a first axis, and a shift lever. The shift lever is mounted on the base and is pivotable about the first axis along a first shift path. In a first segment of the first shift path the shift lever is movable in a cable-actuation mode and the shift lever urges the cable attachment bracket to pivot about the first axis. In a second segment of the first shift path the shift lever is movable in an electronic-actuation mode, and the shift lever does not urge the cable attachment bracket to pivot about the first axis.

In accordance with another aspect, the shift lever of the transmission shifter is pivotable about the first axis along the first shift path, and in a first segment of the first shift path the shift lever is movable in a cable-actuation mode between a park position, a reverse position, and a neutral position, and in a second segment of the first shift path the shift lever is movable in an electronic-actuation mode to at least one lower gear position.

From the foregoing disclosure and the following more detailed description of various preferred embodiments, it will be apparent to those skilled in the art that the present invention provides a significant advance in the technology and art of shift assemblies. Particularly significant in this regard is the potential the invention affords for enhancing transmission control options available to a driver of a vehicle. Additional features and advantages of various preferred embodiments will be better understood in view of the detailed description provided below.

It should be understood that the appended drawings are not necessarily to scale, presenting a somewhat simplified representation of various preferred features illustrative of the basic principles of the invention. The specific design features of the transmission shifter as disclosed here, including, for example, specific dimensions of the cable attachment bracket and the cable block lever will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the transmission shifter illustrated in the drawings. In general, up or upward refers to the top of the paper in FIG. 4 and down or downward refers to a direction towards the bottom of the paper in FIG. 4.

DETAILED DESCRIPTION OF CERTAIN PREFERRED EMBODIMENTS

It will be apparent to those skilled in the art, that is, to those who have knowledge or experience in this area of technology, that many uses and design variations are possible for the transmission shifters disclosed here. The following detailed discussion of various alternative and preferred features and embodiments will illustrate the general principles of the invention with reference to a transmission shifter for use in controlling the gear transmission of a motor vehicle, such as a sport utility vehicle (SUV), or pickup truck. Other embodiments suitable for other applications will be apparent to those skilled in the art given the benefit of this disclosure.

Figure 1:
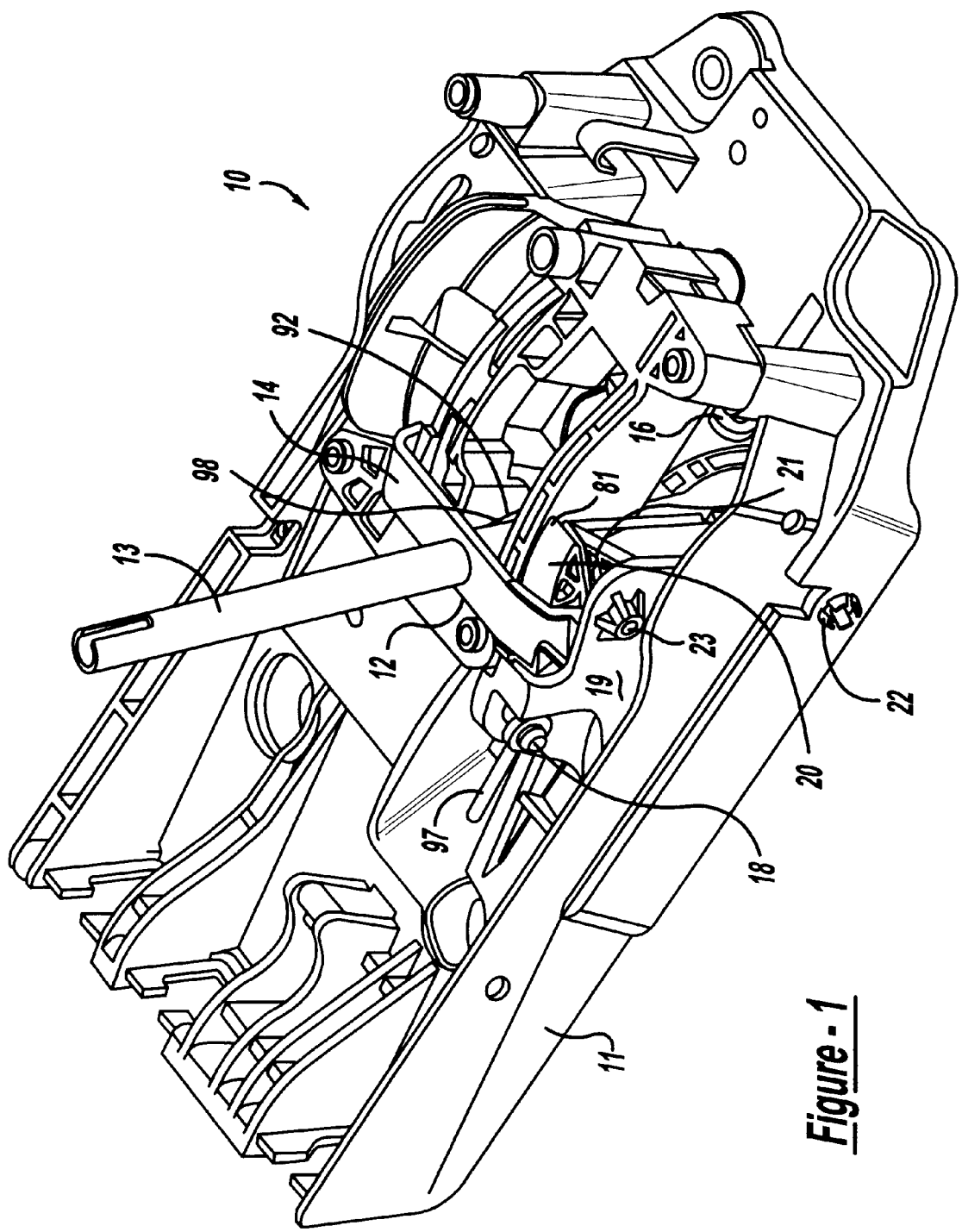
FIG. 1 is a perspective view of a preferred embodiment of a transmission shifter with the bezel removed, illustrating the transmission shifter in a park position.

Turning now to the drawings, FIG. 1 shows a transmission shifter 10 in accordance with a preferred embodiment. For clarity of illustration, a bezel assembly has been removed, along with a handle for the shift lever 13. Shift lever 13, shown in a park position in FIG. 1, is abutting stop 12 of base 11. The shift lever 13 is pivotably mounted on the base 11 so that it pivots about a first axis around pivot pin 22. The shift lever is also pivotable about a side to side pivot pin 16 so that the shift lever can be moved to the tiptronic position, shown in FIG. 7 and discussed in greater detail below. Also pivotable about the first axis pivot pin 22 is a cable attachment bracket 19. Top bracket 14 is affixed to the shift lever 13 and is positioned between the cable attachment bracket and a cable block lever 20. The cable block lever 20 has a first end 81 shown in contact with the top bracket 14 and a second end 82 (seen in FIGS. 4–6). Cable attachment bracket has a mounting pin 18 for receiving a cable 97. The cable is typically a push-pull cable operatively connected to the gear transmission of a motor vehicle. Motion of the cable in one direction moves the gear transmission to one position, and motion of the cable in a second direction opposite the first moves the gear transmission to another position. In accordance with known shifter designs, shift lever 13 is typically hollow, with a spring biased pushrod or pawl 98 actuated by a button on the shifter handle. The pawl 98 engages one of a series of detents on the base which correspond to the familiar shift positions. For example, in FIG. 1, pawl 98 engages detent 92.

Figure 2:
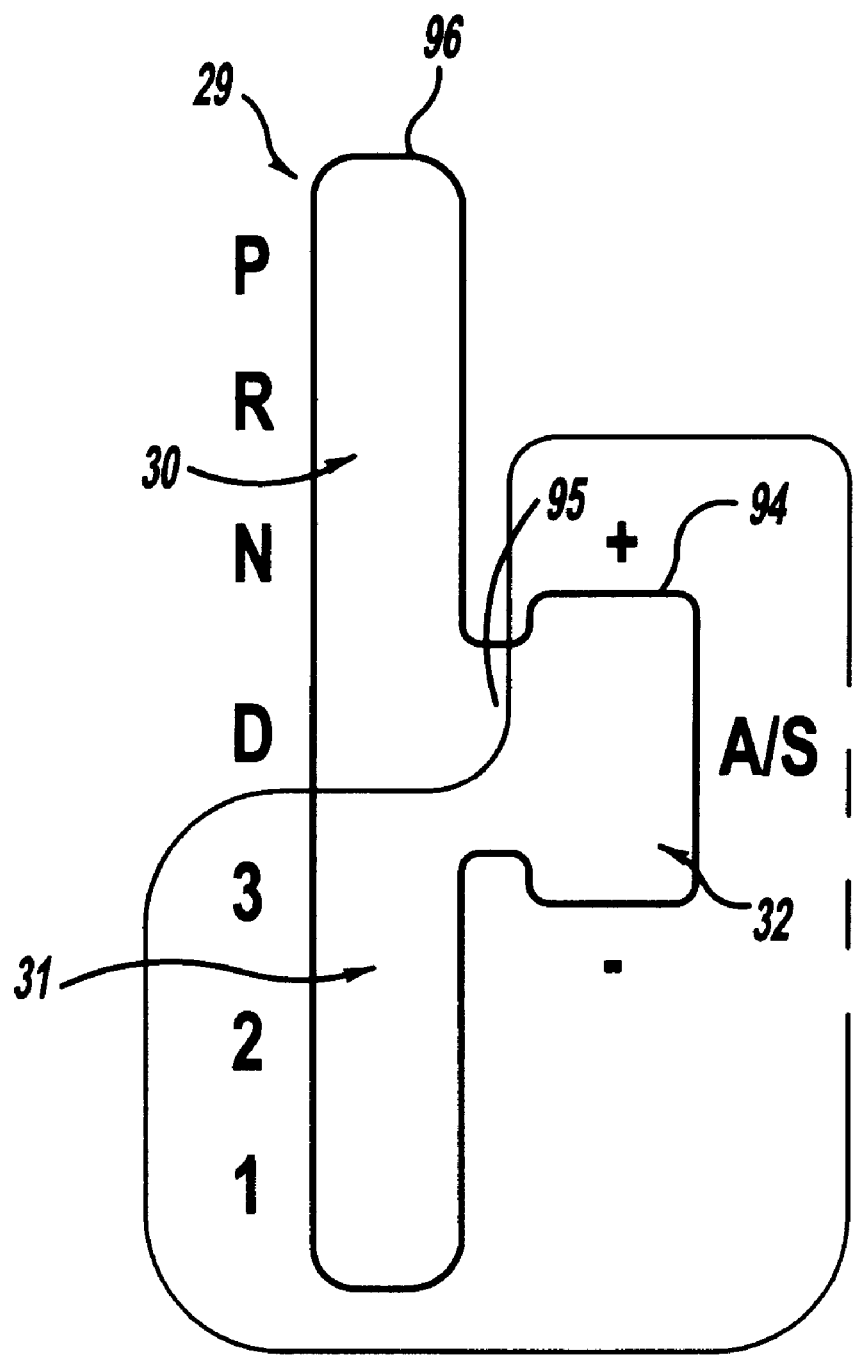
FIG. 2 is a schematic representation of one preferred embodiment of a shift pattern suitable for use with the shifter of FIG. 1, and indicates the portion of the shift pattern which actuates the gear transmission via cable control and the portion which actuates the gear transmission via electronic control.

FIG. 2 shows a preferred embodiment of a shift path 29 for the shift lever 13. That is, the shift lever would extend through an opening in the bezel assembly corresponding to this pattern. Shift path 29 comprises first gear shift path 96 connected to a second gear shift path 94 which is generally parallel to the first gear shift path by crosscar gate 95. The shift lever is pivotable about the first axis along first shift path 96. In accordance with a highly advantageous feature, the first shift path 96 has a first segment 30 in which the gear transmission of a motor vehicle is controlled by cable-actuation, and a second segment 31 in which the gear transmission of a motor vehicle is controlled electronically, all occurring as the shift lever pivots along the first axis. As shown here, the first segment 30 is associated with the park (P) position, the reverse (R) position, the neutral position (N) and the drive position (D) of the gear transmission of a motor vehicle. The second segment 31 of the first shift path 96 is associated with at least one lower gear, for example, third gear (3), second gear (2), and first gear (1). The shift lever is also pivotable through the crosscar gate 95 from the drive position D to a tiptronic or "autostick" (A/S) position 32 where shifting up one gear is affected by moving the shift lever toward the "+", and shifting down by one gear is affected by moving the shift lever toward the "−". Note that the crosscar gate limits motion of the shift lever to the autostick position only from the drive position. It will be readily apparent to those skilled in the art, given the benefit of this disclosure, that the segment of the first shift path which is cable-actuated may be modified by modifying the shape and size of the cable block lever 20 or the wall 25, depending upon intended use. For example, the segment of the first shift path which is cable-actuated may end at the neutral position instead of the drive position, and the crosscar gate may be positioned at the neutral position.

Figure 3:
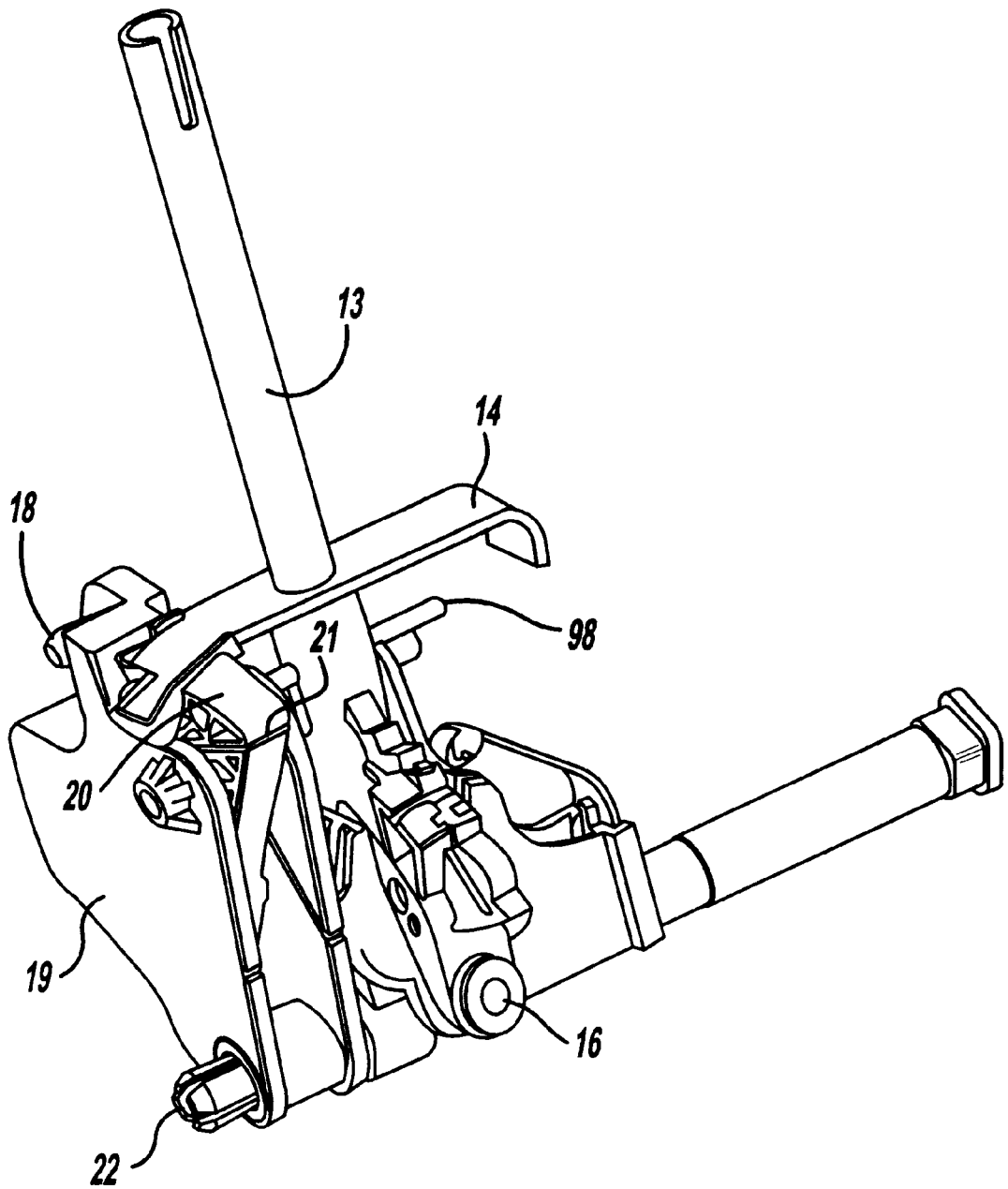
FIG. 3 is a perspective view of the preferred embodiment of the transmission shifter of FIG. 1, shown in the reverse position with the base removed.

FIG. 3 is a perspective view of the transmission shifter of FIG. 1 with the base removed. In accordance with known techniques, artificial feel at each gear position is produced through the use of rollers on detents. That is, a tactile sensation is transmitted to the operator of the shift lever to help indicate that the shift lever has been properly moved to the intended gear transmission control position.

Figure 4:
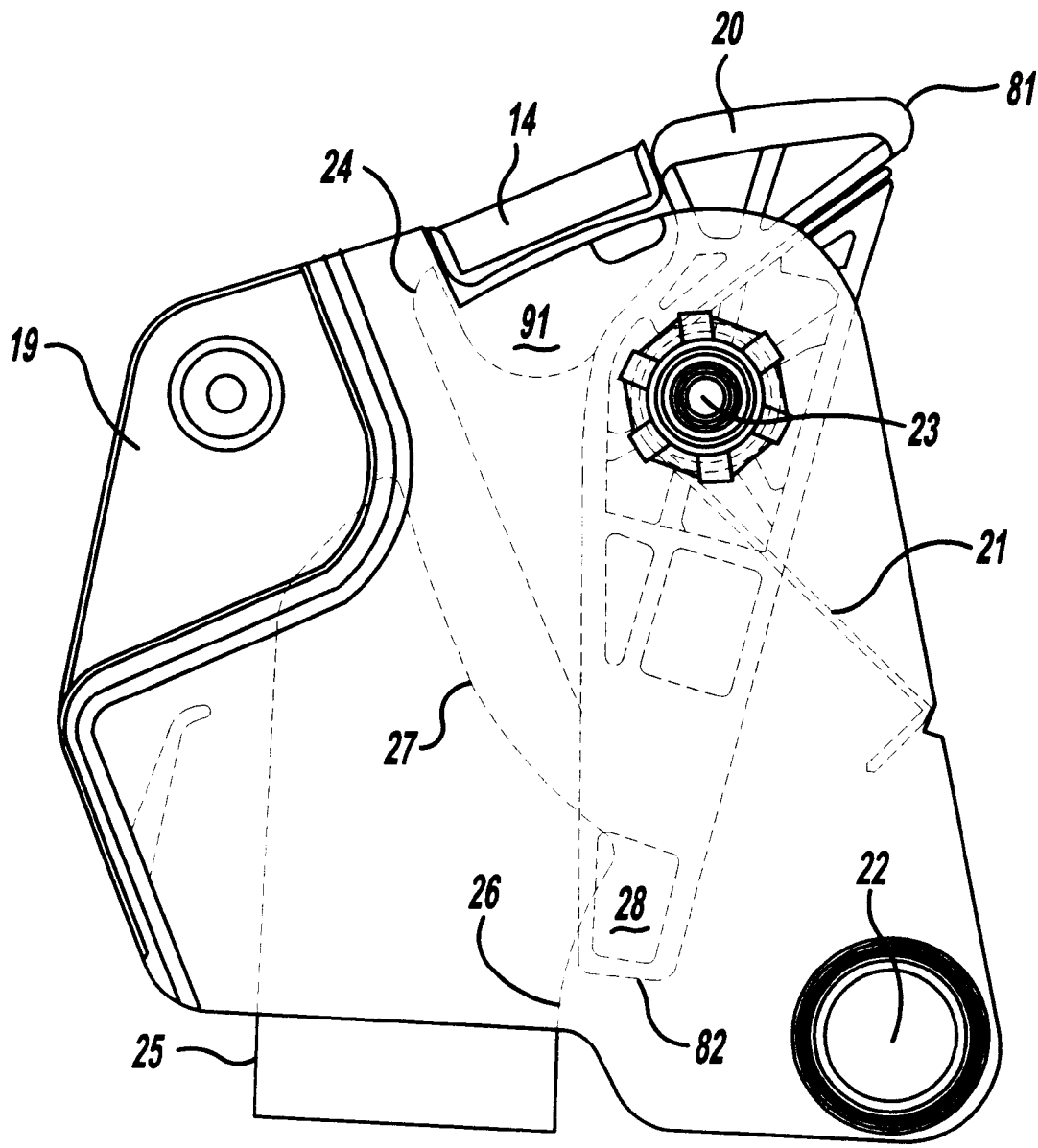
FIGS. 4–6 are schematic side views of the cable block lever, the cable attachment bracket and the top bracket, showing their positions with respect to one another as the shift lever moves from the park position (FIG. 4), to the drive position (FIG. 5) and to a lower gear position (FIG. 6), where the transmission is controlled electronically.
Figure 5:
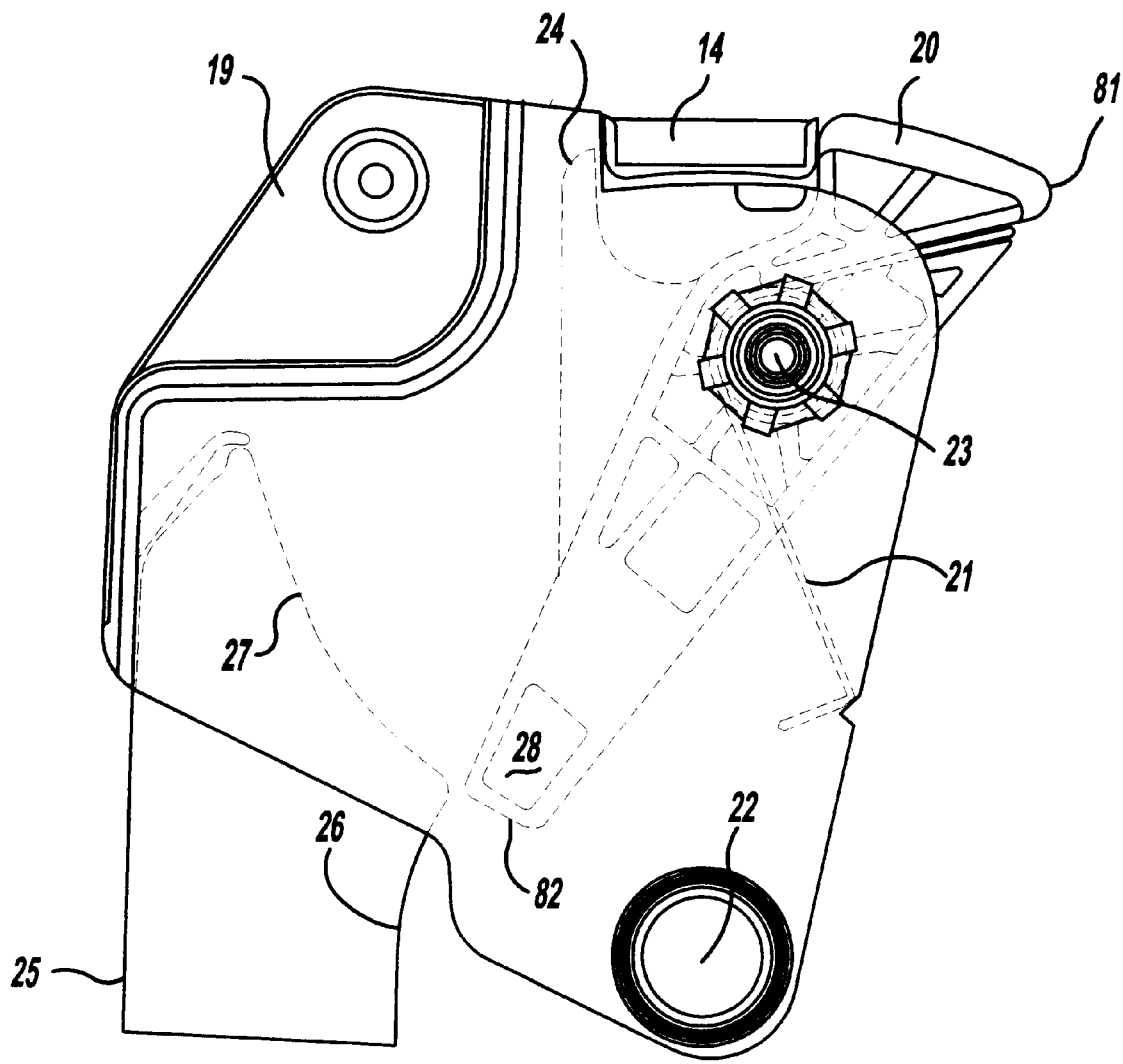
Figure 6:
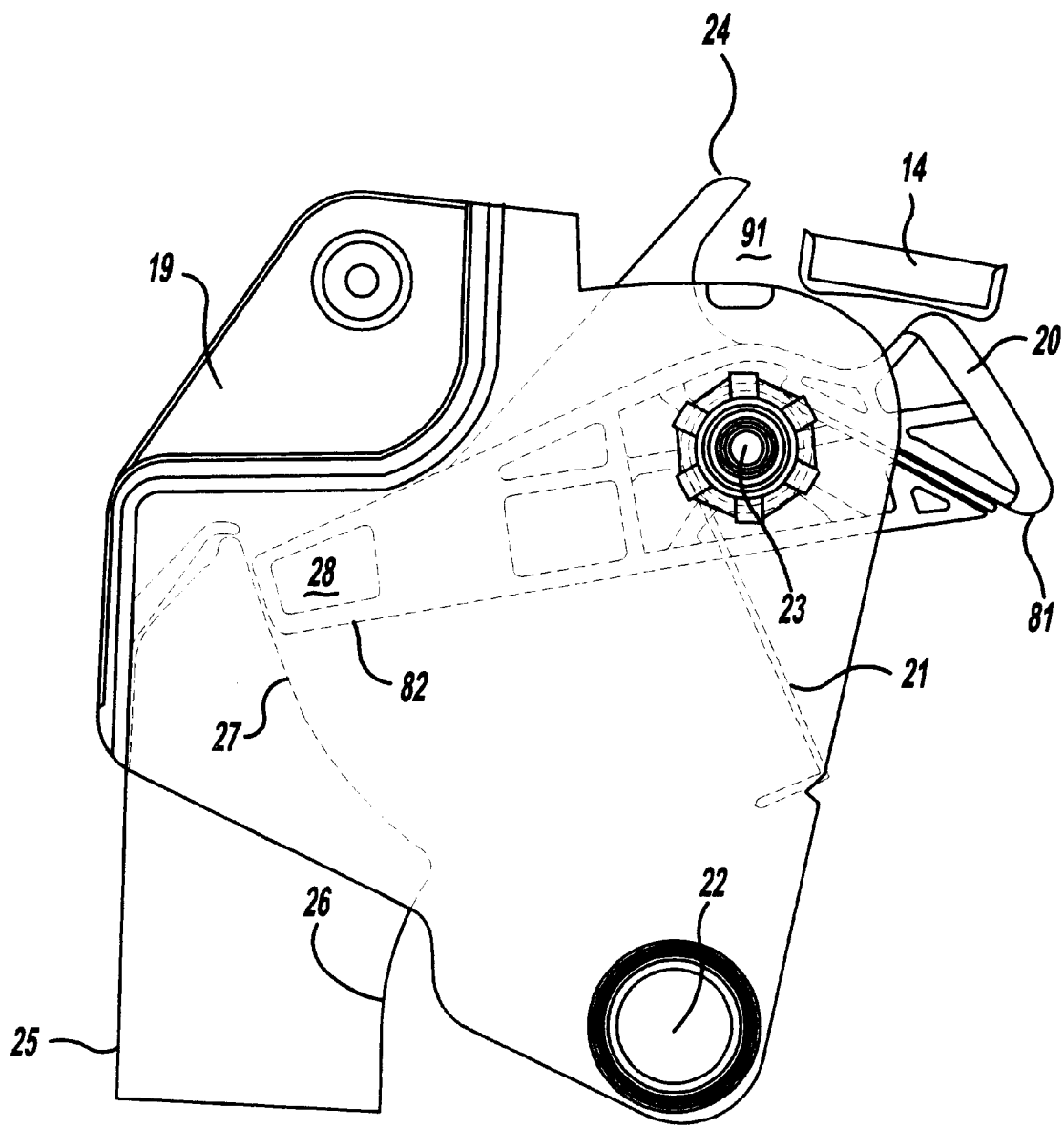

FIGS. 4–6 show a preferred embodiment for accomplishing the unique cable disengagement technique permitting the shift lever to move from a cable-actuation mode to an electronic actuation mode as the shift lever continuously pivots about the first axis. In FIG. 4 the shift lever is in the park position such that top bracket 14 abuts against stop 12. Cable block lever 20 is pivotably mounted about the cable attachment bracket 19 at cable block lever rivet 23. Optionally, a spring 21 may be positioned with one end mounted on the cable attachment bracket and the other end mounted on the cable block lever so as to bias the cable block lever against the top bracket 14 of the shift lever 13 (as seen in FIG. 4).

The cable block lever 20 has a slot 28. A wall 25 is formed from the base 11, preferably as a unitary extension of the base. A first surface 26 of the wall has a first radius of curvature and a second surface 27 has a second radius of curvature. In the park position, the cable block lever abuts against the wall and a portion of the wall is positioned in the slot 28. Between the park position of FIG. 4 and the drive position of FIG. 5 the cable attachment bracket 19 rotates around first axis pivot pin 22 in response to actuation of the shift lever. More specifically, from the park position actuation of the shift lever 13 releases the pawl 98 from the detent 92 (shown in FIG. 1) and permits the shift lever to pivot about the first axis, and pivoting of the shift lever along this first segment causes the top bracket 14 to contact the first end 81 of the cable block lever 20, urging the lever to rotate about rivet 23. Although the cable block lever 20 is pivotably mounted on the cable attachment bracket 19, the cable block lever is prevented from rotating with respect to the cable attachment bracket as long as the second end 82 of the cable block lever remains in contact with the first surface 26 of the wall 25. Thus, the cable attachment bracket 19 travels with the cable block lever 20 as the shift lever is pivoted from park to drive. This means that the transmission shifter is in cable actuation mode, urging cable 97 to move when the shift lever is in the first segment of the first shift path.

In this preferred embodiment, the radii of the surfaces 26, 27 of the wall 25 are set so that the cable block lever clears the first surface 26 once the shift lever reaches the drive position, as shown in FIG. 5. With additional rotation of the shift lever 13, as shown in FIG. 6, the cable block lever is now free to rotate with respect to the cable attachment bracket 19. Thus, additional rotation of the shift lever 13 along this second segment of the first axis does not cause movement of the cable.

The cable block lever 20 may optionally be provided with a return or hook 24. The hook 24 may be formed as a unitary projection which cooperates with the remainder of the cable block lever to form a pocket 91 which receives the top bracket 14 along the first segment of the first shift path.

Although the spring 21 would normally bias the cable block lever toward the top bracket 14 of the shift lever 13, the spring could become inoperational. To ensure that the cable block lever returns with the top bracket as the top bracket returns to the park position, the hook ensures that the top bracket will catch the cable block lever. Thus, the hook helps to ensure that as the shift lever moves from the second segment 31 along the first axis to the first segment 30, the cable block lever moves with the cable attachment bracket 19 and cable actuation of the gear transmission is reestablished.

Figure 7:
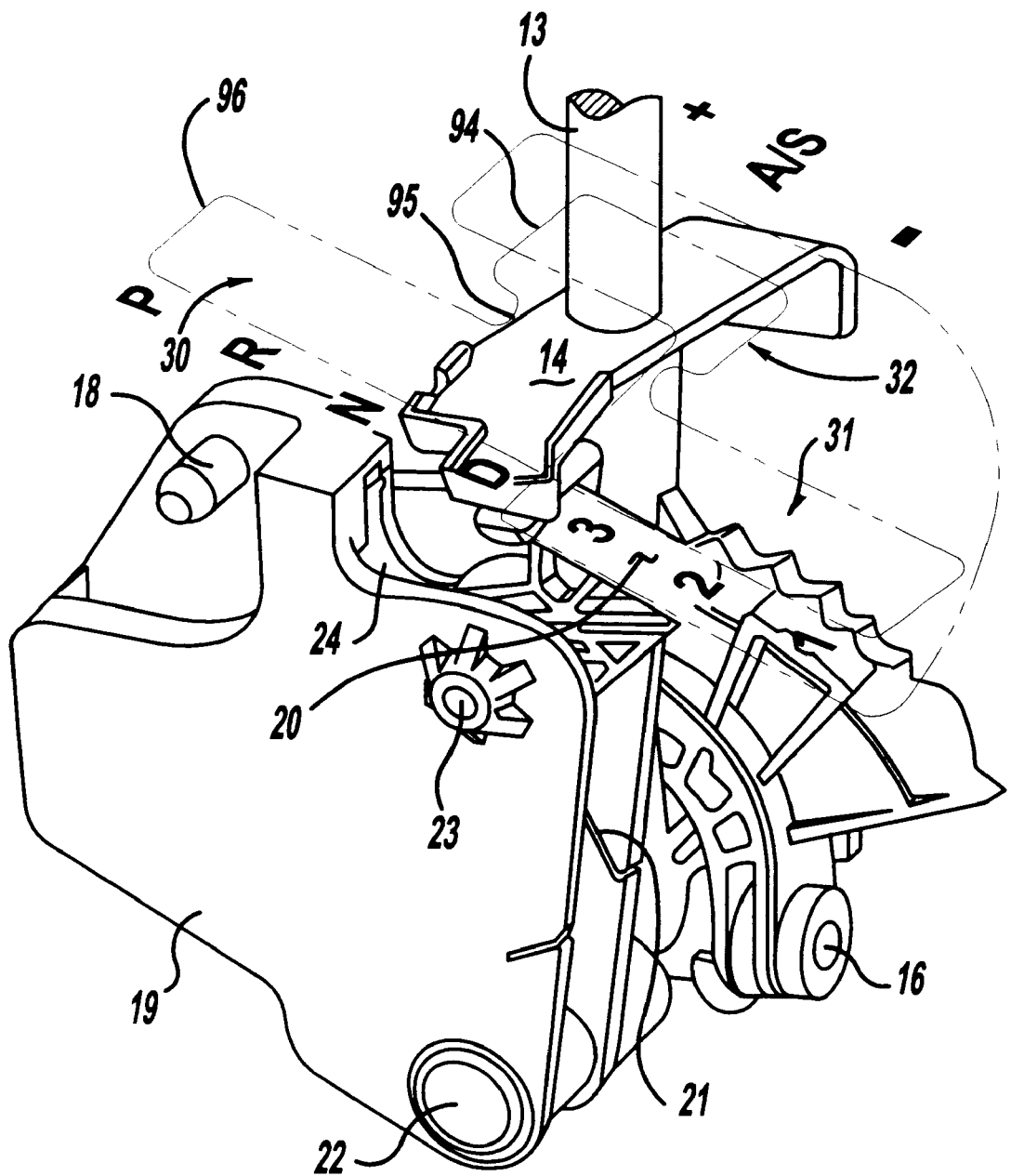
FIG. 7 is a perspective view of the preferred embodiment of FIG. 1 with the shift lever pivoted away from the cable block lever to the second shift path for tiptronic shifting.

FIG. 7 shows the shift lever 13 pivotable to the second shift path 94 (shown in phantom). Shift lever 13 is pivotable about side to side pivot pin 16 from the drive position to the autostick position such that the top bracket 14 separates from the cable block lever 20 and the cable attachment bracket 19. Thus, in the tiptronic or autostick position, motion of the shift lever does not move the cable attachment bracket, the cable 97 stays put, and the gear transmission is controlled electronically. In the autostick mode, the shift lever 13 is shifted toward the + for upshifting of the gear transmission and toward the − for downshifting.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A transmission shifter comprising, in combination:
   a base;
   a cable attachment bracket mounted on the base and pivotable about a first axis; and
   a shift lever, mounted on the base and pivotable about the first axis along a first shift path;
   wherein in a first segment of the first shift path the shift lever is movable in a cable-actuation mode and the shift lever urges the cable attachment bracket to pivot about the first axis, and in a second segment of the first shift path the shift lever is movable in an electronic-actuation mode and the shift lever does not urge the cable attachment bracket to pivot about the first axis.

2. The transmission shifter of claim 1 further comprising a cable block lever pivotably mounted on the cable attachment bracket, wherein the cable block lever has a first end which is pushed by the shift lever as the shift lever pivots along the first shift path.

3. The transmission shifter of claim 2 wherein the cable block lever has a second end which contacts the base as the shift lever moves along the first segment so that the cable block lever and the cable attachment bracket move together as the shift lever pivots along the first segment.

4. The transmission shifter of claim 3 wherein the second end of the cable block lever pivots free of the base as the shift lever moves from the first segment to the second segment, and the cable block lever is free to rotate with respect to the cable attachment bracket as the shift lever moves along the second segment.

5. The transmission shifter of claim 2 further comprising a spring biasing the cable block lever toward the shift lever.

6. The transmission shifter of claim 2 wherein the shift lever has a top bracket, and the top bracket contacts the cable block lever as the shift lever pivots.

7. The transmission shifter of claim 2 wherein the cable block lever further comprises a hook positioned so that when the shift lever moves from the second segment along the first axis to the first segment the shift lever contacts the hook, urging the cable block lever to move with the shift lever.

8. The transmission shifter of claim 1 wherein the shift lever is pivotable along the first segment of the first shift path between a park position, a reverse position, a neutral position, and a drive position.

9. The transmission shifter of claim 8 wherein the shift lever is pivotable about the second segment of the first shift path to at least one lower gear position.

10. The transmission shifter of claim 9 wherein the shift lever is movable from the first shift path to a second shift path generally parallel to the first shift path through a crosscar path, and the shift lever is movable to a tiptronic position when in the second shift path.

11. The transmission shifter of claim 10 wherein the shifter is in electronic-actuation mode when in the at least one lower gear position and when in the tiptronic position.

12. The transmission shifter of claim 10 wherein the shift lever is movable from the first shift path to the second shift path only from the drive position.

13. A transmission shifter comprising, in combination:
    a base; and
    a shift lever, mounted on the base and pivotable about a first axis along a first shift path;
    wherein in a first segment of the first shift path the shift lever is movable in a cable-actuation mode between a park position, a reverse position, and a neutral position, and in a second segment of the first shift path the shift lever is movable in an electronic-actuation mode to at least one lower gear position.

14. The transmission shifter of claim 13 wherein the shift lever is movable to a drive position as the shift lever pivots about the first segment.

15. The transmission shifter of claim 14 wherein the shift lever is further movable from the first shift path to a second shift path through a crosscar gate which is generally perpendicular to the first shift path.

16. The transmission shifter of claim 15 wherein the shift lever is movable from the first shift path through the crosscar gate only from the drive position.

17. The transmission shifter of claim 13 further comprising a cable attachment bracket mounted on the base and pivotable about the first axis.

18. The transmission shifter of claim 17 further comprising:
    a cable block lever pivotably mounted on the cable attachment bracket;
    a wall of the base having a first radius and a second radius;
    a top bracket attached to the shift lever wherein the top bracket is situated between the cable attachment bracket and the cable block lever; and
    a spring biasing the cable block lever against the top bracket holding the cable block lever in place with respect to the cable attachment bracket when the shift lever is in the first segment and when the shift lever is moved to a tiptronic position in a second shift path generally parallel to the first.

19. The transmission shifter of claim 18 wherein the cable block lever has a slot and a portion of the wall are positioned in the slot when the shift lever is in the park position.

* * * * *